W. Strunk,
Window Shade.
No. 109,271.   Patented Nov. 15, 1870.

Witnesses.
W. H. Burridge
D. L. Humphreys

Inventor.
William Strunk
Per Burridge & Co.
Attys
Cleveland, O.

United States Patent Office.

WILLIAM STRUNK, OF NETTLE LAKE, OHIO.

Letters Patent No. 109,271, dated November 15, 1870.

IMPROVEMENT IN WINDOW-SHADES.

The Schedule referred to in these Letters Patent and making part of the same.

*To all whom it may concern:*

Be it known that I, WILLIAM STRUNK, of Nettle Lake, in the county of Williams and State of Ohio, have invented certain new and useful Improvements in Window-Shades, of which the following is a description, reference being had to the accompanying drawing making part of this specifiation.

Like letters of reference refer to like parts in the different views.

Figure 1:
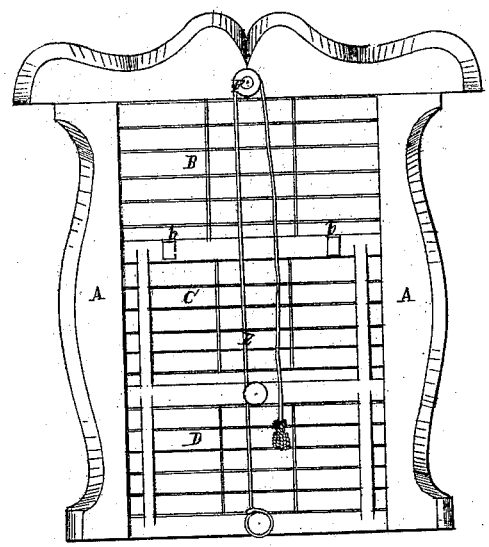
Figure 1 is a front view of the window-shade when closed.

In fig. 1—

A represents the frame in which the shades are secured and slide.

Said shades are three in number, B, C, and D, which, however, may be more or less, as the height of the window may require.

Figure 2:
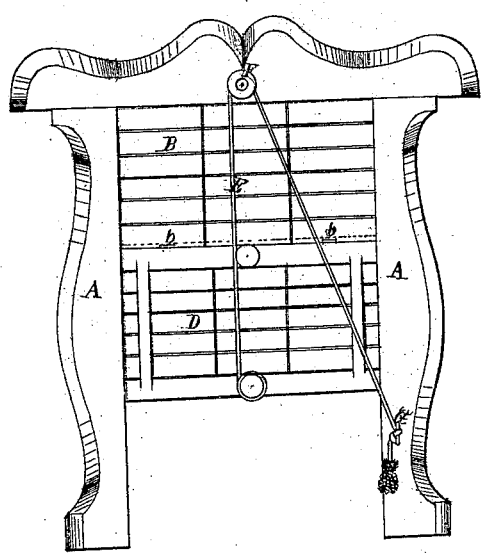
Figure 2 is a front view of the shade when partially raised.
Figure 3:
Figure 3 is a side view.

The shade B is a fixture in the frame, whereas the shades C D are movable, they being secured in the frame by means of grooves $a$, fig. 3, formed on the inside of the frame, and in which the ends of the shades C D are fitted and slide upward and downward by means of the cord E, one end of which is attached to the lower shade D; from thence it is carried up over a sheave, F, as shown in fig. 2.

The application of this shade to the window is as follows:

The frame A is attached to the inside casing of the window in any appropriate way as a fixture. In order to raise the lower shade D, the operator pulls upon the cord E, the result of which will be to draw up the lower shade to the position shown in fig. 2. At this height it is arrested by the projecting fingers $b$, fig. 1, catching upon the upper edge of the shade. Should a further elevation of the shade or shades be required, the operator continues to pull upon the cord, which will raise the lower shade D still higher, carrying with it the shade C.

The two lower shades may, by this means, be raised to the top of the frame, or at any desired height, and there secured by tying the cord to the cleat or pin G.

This shade can be easily put up or taken down from the window, as the season or other circumstances may require, the frame being secured to the window in a temporary manner, and not as a permanent fixture, unless so required.

Claim.

What I claim as my improvement, and desire to secure by Letters Patent, is—

The herein-described movable shades C D and immovable shade B, when arranged in relation to each other, with the fingers $b$, in combination with the frame A, so as to operate in the manner as described, and for the purpose set forth.

WILLIAM STRUNK.

Witnesses:
WILLIAM CRIST,
M. H. CRIST.